Nov. 21, 1944. R. S. ROBINSON 2,363,262
DEHUMIDIFYING APPARATUS
Filed Aug. 12, 1941 2 Sheets-Sheet 2

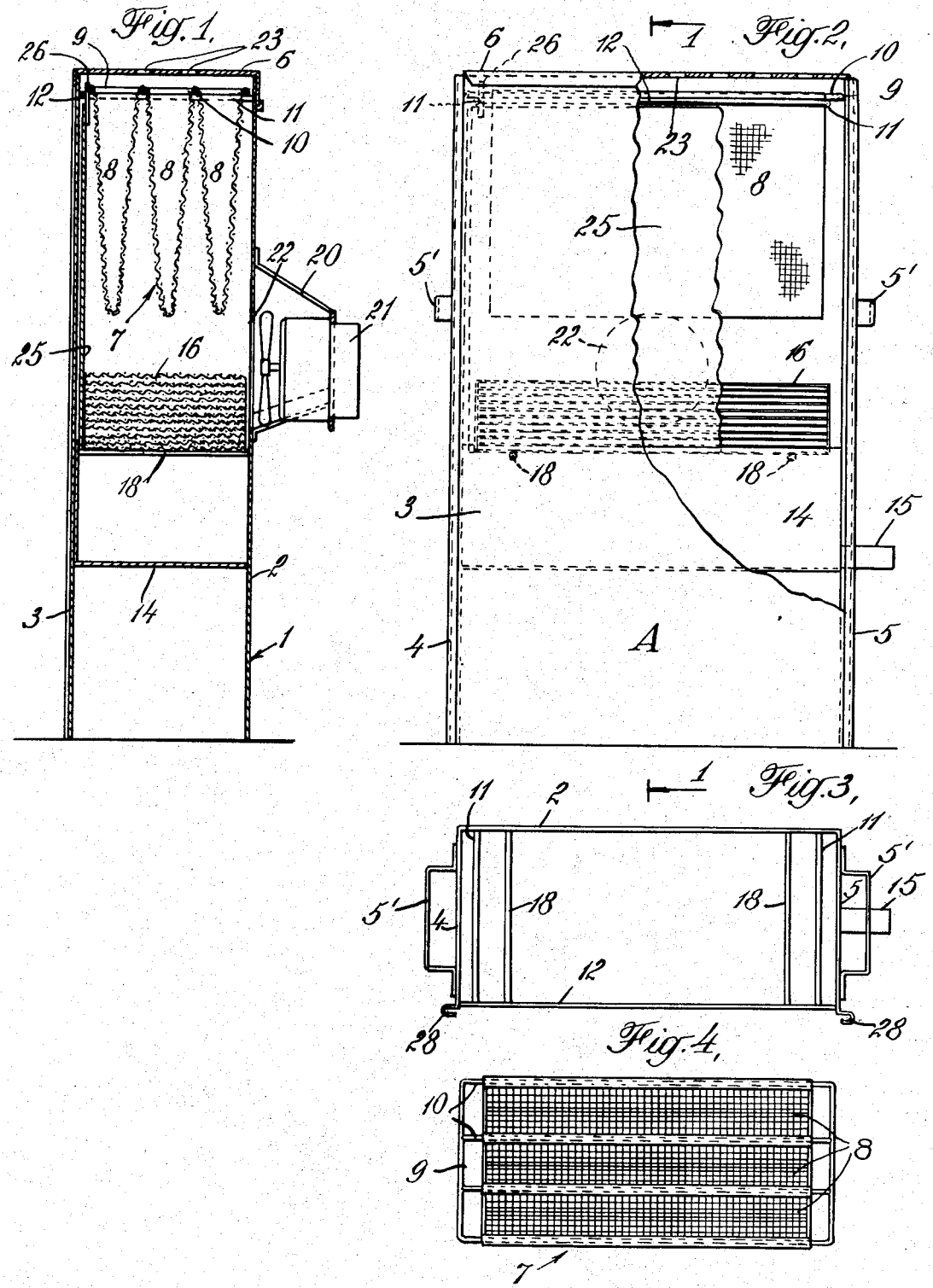

INVENTOR
Richard S. Robinson
BY Gordon A. Wilkins
ATTORNEY

Patented Nov. 21, 1944

2,363,262

UNITED STATES PATENT OFFICE 2,363,262

DEHUMIDIFYING APPARATUS

Richard Sewall Robinson, Syracuse, N. Y., assignor to The Solvay Process Company, New York, N. Y., a corporation of New York Application August 12, 1941, Serial No. 406,507

7 Claims. (Cl. 183—4.3)

This invention relates to dehumidifying apparatus and more particularly to apparatus for preventing or minimizing condensation of atmospheric moisture in enclosed spaces such as buildings.

As is well known, when air containing moisture comes into contact with cool surfaces, such as the walls of rooms, condensation frequently occurs and the condensed moisture is likely to cause deterioration of walls, pipes, furnishings, papers, clothing, food, and the like. Cellars and other rooms having relatively cool walls are particularly susceptible to condensation of atmospheric moisture which often occurs to an extent such that the condensed moisture runs down the walls and forms pools on the floors. The causes of this phenomenon are well known and it has been proposed to prevent such condensation by forcing the air through apparatus containing deliquescent material such as calcium chloride to remove the moisture therefrom.

It is an object of this invention to provide apparatus of improved efficiency for dehumidifying large volumes of air in buildings and portions thereof such as basements, game and recreation rooms, record and storage vaults, stock rooms, warehouses, food establishments, workshops, photographic dark rooms and the like, to regulate the humidity and prevent objectionable condensation of atmospheric moisture therein.

It is another object of the invention to provide dehumidifying apparatus for effecting absorption of larger amounts of atmospheric moisture by a given quantity of deliquescent material such as calcium chloride than has heretofore been obtainable.

It is a further object of the invention to provide dehumidifying apparatus constructed in units which may be combined to obtain any desired dehumidifying capacity. Other objects and advantages will appear hereinafter.

In accordance with the invention there is provided a housing having, preferably in its upper portion, a foraminous container for deliquescent material such as calcium chloride which extracts moisture from air flowing thereover and forms an aqueous solution of the material, a receptacle beneath the container for receiving calcium chloride solution draining therefrom, a multiple layer foraminous baffle preferably constituted of wire mesh material located between the container and the receptacle so that the solution draining from the container into the receptacle passes through the baffle and is distributed thereover in the form of numerous films having a large surface area, and means for impelling flow of air through the housing so that at least a portion of the air first passes through the foraminous baffle in contact with the films of calcium chloride solution thereon, then over the calcium chloride in the container and thence out of the housing. Preferably, the housing is equipped with an opening in one side thereof in the neighborhood of the baffle and a fan maintains flow of air through the opening and baffle, over the container and out of the housing through perforations in the top thereof. We prefer to employ a calcium chloride container such as disclosed in Todd and Keene application Serial No. 406,506, filed August 12, 1941 (now Patent No. 2,306,674 granted December 29, 1942) involving a plurality of upwardly flaring V-shaped pockets having foraminous walls joined together at their tops and separated by downwardly flaring V-shaped spaces between the pockets.

The apparatus may advantageously be constructed in units, each unit being provided with a removable housing wall portion and means for readily securing it to one side of another unit so that two or more units may be assembled together to provide an assembly of any desired dehumidifying capacity. Only one unit of the assembly need be provided with a fan, which fan may serve to effect flow of air to be dehumidified through all of the units.

Distribution of the calcium chloride solution draining from the container in numerous films over the wire screen baffle in the path of incoming air effects contact of the air with a very large surface area of the solution, resulting in substantial absorption of moisture from the air by the solution before the air passes over the solid calcium chloride in the container and dilution of the solution on the baffle. Thus the apparatus promotes highly efficient utilization of the moisture absorbing capacity of the calcium chloride, and, owing to dilution of the solution, prevents or minimizes objectionable caking and crystallization of the solution in the receptacle that might otherwise be caused by temperature changes. Furthermore, construction of the apparatus in units each having a removable wall portion and means for readily attaching them to another unit permits the combination of any desired number of units into a single assembly having any desired dehumidifying capacity without special design and construction for different installations requiring different dehumidifying capacities.

For a further understanding of the invention, reference may be had to the accompanying drawing showing for purposes of illustration a preferred embodiment of the invention, in which:

Figure 1 is a sectional view taken on line 1—1 of Figure 2;

Figure 2 is a view in side elevation, parts being broken away;

Figure 3 is a top plan view of the housing of Figures 1 and 2, parts being omitted;

Figure 4 is a top plan view of the calcium chloride container;

Figure 5:
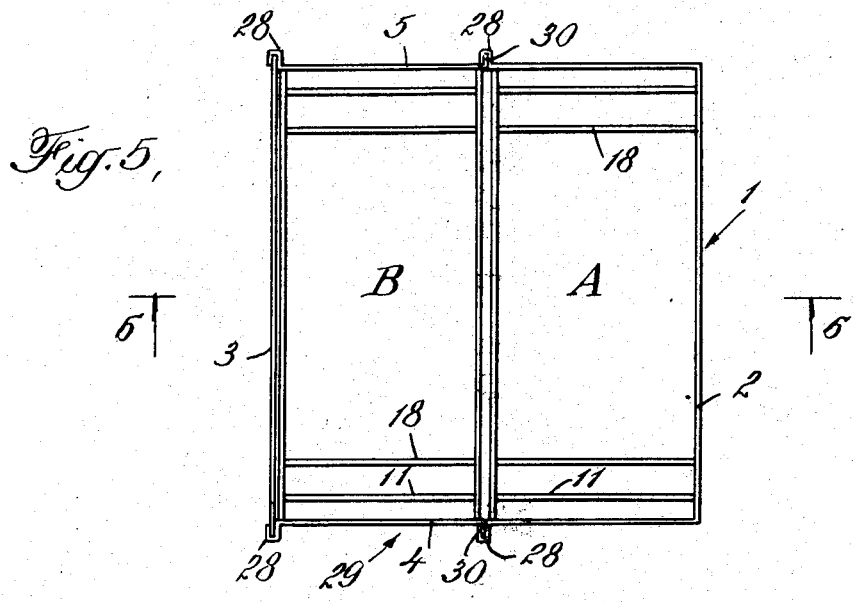
Figure 5 is a top plan view similar to Figure 3, but showing two housing units in assembled relation.

Referring to the drawings, reference numeral 1 designates a housing which may be constructed of any suitable material such as sheet steel having side walls 2, 3, end walls 4, 5 equipped with handles 5', a perforated cover 6 and a container 7 for deliquescent material such as calcium chloride capable of absorbing atmospheric moisture and forming a solution therein. The container 7 involves three upwardly flaring V-shaped pockets 8 separated by downwardly flaring V-shaped spaces, the walls of the pockets being constituted of foraminous material such as galvanized wire screen depending from wire frame member 9 having rods 10 to which the side walls of the pockets are secured. The member 9 extends beyond the ends of the pockets and is supported in readily removable relation on cross members 11 extending across the housing and secured to side 2 thereof and to wire member 12 secured to the end walls of the housing, e. g., by welding.

Located beneath the container in position to catch calcium chloride solution draining therefrom is a receptacle 14 preferably constituted of corrosion resistant material such as galvanized sheet steel, which receptacle may be secured within the housing in any suitable manner, e. g., by rivets or welding. The receptacle 14 is provided with a drain pipe 15 extending outwardly through one end of the housing for removal of calcium chloride solution therefrom from time to time; the drain pipe may normally be closed by any suitable means, for example, an expansible rubber stopper of well known type.

Mounted above the receptacle 14 is a multiple layer foraminous baffle 16 constituted of wire mesh material; the baffle may be made for example by crimping and superimposing from 5 to 15 e. g., about 11, sheets of wire mesh material such as 8-mesh galvanized wire cloth and enclosing the superimposed sheets in a wire mesh envelop; the crimps in the wire sheets maintain the remaining portions of the sheets in spaced apart relation. Baffle 16 is supported within the housing by rods 18 extending across and secured to the upper portion of the receptacle. Mounted exteriorly of the housing on supporting frame 20 is an air impeller 21 which may conveniently be of the conventional electric fan type positioned to blow air through opening 22 and baffle 16, thence upwardly over container 7 and out of the housing through perforations 23 in the cover 6 thereof. Removable plate 25 extends downwardly from adjacent the top of container 7 beside baffle 16 and into receptacle 14 for a purpose to be described hereinafter. This plate has ears 26 extending between container frame 9 and rod 12 to aid in holding it in position.

Figure 6:
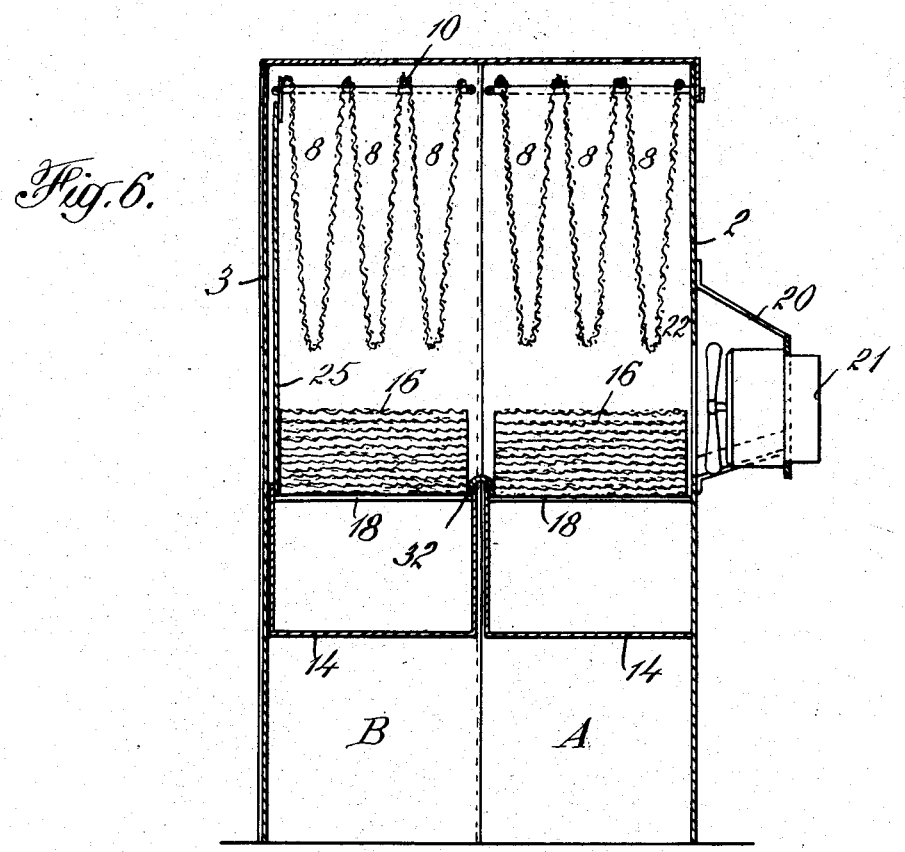
Figure 6 is a vertical sectional view taken on line 6—6 of Figure 5.

As the dehumidifying capacity required for different installations may vary widely depending on the volume and moisture content of the air to be dehumidified, dehumidification apparatus of different capacities may be required for different installations. In order to provide the necessary flexibility of dehumidifying capacity without especially designing and constructing apparatus for each installation, our invention provides for the assembly of two or more dehumidifying units whereby standard apparatus may be utilized to increase the dehumidifying capacity of the apparatus two or more fold. In order to accomplish this the side 3 of unit A is removably mounted in guides 28, which guides may be formed by bending the end walls 4, 5 of the housing. B designates a dehumidifying unit similar to unit A except that the side wall 2 and fan 21 are omitted and the end walls 4, 5 are provided with flanges 30 for slidably engaging in guides 28 of unit A. When it is desired to increase the dehumidifying capacity of the apparatus, the side wall 3 of housing 1 is removed from guides 28, plate 25 is removed and the flanges 30 of unit B are slidably engaged in guides 28 of unit A. Semi-cylindrical member 32 is then engaged over adjacent sides of the receptacles 14 of units A and B as shown in Figure 6 to prevent calcium chloride solution from entering the space between the receptacles, and plate 25 is placed in position in unit B. Thus any number of units may be assembled to afford any desired dehumidifying capacity by removing the outermost side wall 3 and substituting therefor an additional unit similar to unit B.

In operation, perforated cover 6 is removed and the container 7 filled with calcium chloride. Fan 21 may then be started impelling flow of a current of air into the housing through opening 22, at least part of the air passing through baffle 16, and thence upwardly into contact with the solid calcium chloride in the container and out of the housing through perforations 23. As the air passes into contact with the solid calcium chloride, moisture is extracted therefrom and dissolves the chloride, the saturated solution draining from the container and falling on the wire screen baffle 16 which subdivides and distributes it in numerous films over the wires, thereby affording a very large surface area for contact with the air introduced through the opening 22. Owing to the large contact area, the solution absorbs a substantial amount of the moisture content of the air thereby diluting the solution and partially dehumidifying the air prior to passage of the air into contact with the solid calcium chloride. Thus highly efficient utilization of the moisture absorbing capacity of the calcium chloride is accomplished so that a minimum amount of calcium chloride is required to absorb a given amount of atmospheric moisture and dilution of the calcium chloride prevents or minimizes solidification of the chloride in receptacle 14 owing to temperature changes. Plate 25 prevents blowing of the calcium chloride solution by the fan 21 over the side of receptacle 14. As the calcium chloride in the V-shaped container pockets is consumed, it tends to fall to the bottom and one side of the pockets leaving the upper portions of the pockets empty and readily accessible for refilling by simply pouring fresh calcium chloride into the pockets; pockets with parallel side walls are conducive to caking of the calcium chloride in such manner that the empty spaces formed in the container are not readily accessible for refilling.

As hereinabove indicated, the dehumidifying capacity of the apparatus may be increased at will by removing the side wall 3 and assembling together with the unit A one or more units B in the manner hereinabove disclosed.

Thus it will be seen the invention provides apparatus for dehumidifying large volumes of air utilizing in a highly efficient manner the moisture of absorbing capacity of deliquescent material such as calcium chloride. The apparatus is of highly flexible dehumidifying capacity and may be adapted for installations requiring widely varying capacity without designing and constructing special equipment for each particular installation.

Since certain changes may be made without departing from the scope of the invention, it is intended that the above shall be interpreted as illustrative and not in a limiting sense.

What is claimed is:

1. Portable sectional apparatus of variable capacity for dehumidifying air comprising a plurality of portable open-top communicating units, each of said units comprising two substantially parallel upstanding walls, said units being detachably connected together in side-by-side relation with said parallel vertical walls of adjacent units in substantially abutting relation throughout their heights, said units collectively defining a housing, a foraminous container for deliquescent material for each unit, means within each unit for supporting the container therefor for ready removal and insertion individually through the top of the unit, a foraminous baffle located within each unit beneath the container therein so that solution of deliquescent material draining from said containers falls on said baffles and is distributed in film form thereon, a receptacle within each unit beneath the baffle therein for receiving solution of deliquescent material draining through the baffle, an opening in an end one of said units in the neighborhood of the baffle therein, and a fan mounted on said unit adjacent said opening for blowing a current of air into said housing over said baffles and then over said containers, whereby a portion of the moisture content of the air is absorbed by the solution on said baffles and the solution is diluted, and air is further dehumidified by contact with the deliquescent material in said containers, thereby forming additional solution which drains from the containers onto said baffles.

2. Portable sectional apparatus of variable capacity for dehumidifying air comprising a plurality of communicating portable units detachably connected together in side-by-side relation and collectively defining a housing, each of said units having two vertical substantially parallel walls and an open top, opposite vertical edge portions of said walls being shaped to provide vertically extending grooves and complementary tongues for detachably securing the wall portions of adjacent units in substantially abutting relationship, a container for calcium chloride for each unit, means in the upper portion of each unit for detachably supporting the container therefor so it may be readily removed and inserted vertically through the top of the unit, a foraminous baffle comprising a plurality of layers of wire-mesh material located in each unit below the container for that unit, a receptacle located in each unit below the baffle for that unit, and means for impelling movement of air through said housing so that it first passes through said baffles and then over deliquescent material in said containers.

3. Apparatus as defined in the preceding claim in which an end unit of said housing comprises an upstanding wall substantially perpendicular to the said parallel walls, said perpendicular wall being provided with an opening at about the level of said baffles, and a fan mounted on said end unit adjacent said opening for blowing air through said opening and said baffles and thence over calcium chloride in said containers.

4. Dehumidifying apparatus comprising in combination a portable vertical housing having vertical walls, an open top and a foraminous removable cover therefor, a container for calcium chloride involving a plurality of foraminous pockets of downwardly tapered V-shape, means in the upper portion of said housing for supporting said container so that it may be readily inserted and removed through said top of the housing, a foraminous baffle comprising a multiplicity of spaced layers of wire-mesh material located within said housing beneath said container so that calcium chloride solution draining from said container falls on said baffle and is distributed thereon in numerous films having a large surface area, a receptacle within said housing beneath said baffle for receiving calcium chloride solution draining therethrough, one of the vertical walls of said housing being provided with an opening in the neighborhood of said baffle, a fan mounted on said housing adjacent said opening for blowing a current of air into said housing over said baffle and then over said container, whereby a portion of the moisture content of the air is absorbed by the solution on said baffle and the solution is diluted and the air is further dehumidified by contact with the calcium chloride in said container, thereby forming additional solution which drains from the container onto said baffle, and a plate extending downwardly along a wall of said housing opposite said fan and into said receptacle to prevent the fan from blowing the solution over the edge of the receptacle, said plate and the wall along which it extends being removable.

5. Dehumidifying apparatus comprising in combination a portable vertical housing having substantially vertical walls forming an open top for the housing, a foraminous container for deliquescent material, means in the upper portion of said housing for supporting the container so that it may be readily inserted and removed through said top of the housing, a foraminous baffle located within said housing beneath said container so that solution of deliquescent material draining from said container falls on said baffle and is distributed in film-form thereon, a receptacle within said housing beneath said baffle for receiving the solution draining therethrough, one of the vertical walls of said housing being provided with an opening in the neighborhood of said baffle, a fan adjacent said opening for blowing a current of air into the housing and then over said container whereby a portion of the moisture content of the air is absorbed by the solution on said baffle and the air is further dehumidified by contact with the deliquescent material in said container, thereby forming additional solution which drains from the container onto said baffle, and a plate extending downwardly along a wall of said housing opposite said fan and into said receptacle to prevent the fan from blowing the solution over the edge of the receptacle, said plate and the wall along which it extends being removable.

6. Portable sectional apparatus of variable capacity for dehumidifying air comprising a plurality of portable open-top units communicating with each other, said units being detachably connected together in horizontally disposed side-by-side relation and collectively defining a housing, each of said units comprising two upstanding substantially parallel walls connected throughout their heights to walls of adjacent units, said parallel walls collectively forming two parallel side walls of said housing, the two exterior units having additional walls forming the ends walls of the housing, the end wall of one of said exterior units being removable, the other exterior unit being provided with an opening therein, a container for deliquescent material in each of said units, means within each unit for supporting the container therefor for ready removal and insertion through the top of the unit, a foraminous baffle located within each unit beneath the container therein, whereby solution of material draining from said containers is distributed in film-form over said baffles, and means for impelling movement of air through said opening so that the air passes first through said baffles and then into contact with deliquescent material in said containers and thence out of said apparatus through the tops of said units.

7. Portable sectional apparatus of variable capacity for dehumidifying air comprising a plurality of portable open-top units communicating with each other, each of said units comprising two substantially parallel upstanding walls, said units being detachably connected together in horizontally disposed side-by-side relation and collectively defining a housing, said parallel walls of adjacent units extending in substantially abutting relation throughout their heights and collectively forming two parallel side walls of said housing, the two exterior units of said apparatus being provided with vertical walls extending substantially at right angles to said first-named walls and forming the end walls of said housing, a foraminous container for deliquescent material for each unit, means within each unit for supporting the container therefor for ready removal and insertion through the top of the unit, a foraminous baffle located within each unit beneath the container therein, so that solution of deliquescent material draining from the containers is distributed in film-form over the baffles, a receptacle within each unit beneath the baffle therein for receiving solution of deliquescent material draining from the baffle, one of the end walls of said housing being provided with an opening at about the level of said baffles, a fan mounted on said apparatus adjacent said opening for blowing a current of air into said housing over said baffles, then over said containers and out of the tops of said units, whereby a portion of the moisture content of the air is absorbed by the solution on said baffles and the air is further dehumidified by contact with the deliquescent material in said containers, thereby forming additional solution which drains from the containers onto said baffles, the other end wall of said housing being removable.

RICHARD SEWALL ROBINSON.